United States Patent
Shifris et al.

(10) Patent No.: US 9,196,999 B2
(45) Date of Patent: Nov. 24, 2015

(54) TWO-PART MODULAR CONNECTOR AND SMART MANAGED INTERCONNECT LINK USING THE TWO-PART MODULAR CONNECTOR

(75) Inventors: Pinchas Shifris, Tel Aviv (IL); Tzion Priav, Ramat Gan (IL); Ben Carmi, Tel Aviv (IL); Alex Shar, Rishon Letzion (IL)

(73) Assignee: RIT Technologies Ltd., Tel Aviv (IL)

( * ) Notice: Subject to any disclaimer, the term of this patent is extended or adjusted under 35 U.S.C. 154(b) by 17 days.

(21) Appl. No.: 13/805,671

(22) PCT Filed: Dec. 27, 2011

(86) PCT No.: PCT/IL2011/000966
§ 371 (c)(1),
(2), (4) Date: Dec. 20, 2012

(87) PCT Pub. No.: WO2012/098538
PCT Pub. Date: Jul. 26, 2012

(65) Prior Publication Data
US 2013/0095694 A1    Apr. 18, 2013

Related U.S. Application Data

(60) Provisional application No. 61/427,678, filed on Dec. 28, 2010.

(51) Int. Cl.
*H01R 13/46* (2006.01)
*H01R 13/66* (2006.01)
(Continued)

(52) U.S. Cl.
CPC .......... *H01R 13/465* (2013.01); *H01R 13/6658* (2013.01); *H04Q 1/136* (2013.01);
(Continued)

(58) Field of Classification Search
USPC .......... 439/488, 499, 491, 713; 340/572, 815; 324/66, 542; 385/512
See application file for complete search history.

(56) References Cited

U.S. PATENT DOCUMENTS 6,222,908 B1    4/2001   Bartolutti et al.
6,906,505 B2 *  6/2005   Brunet et al. .................. 324/66
(Continued)

FOREIGN PATENT DOCUMENTS

CN    1983980       6/2007
CN    101124828     2/2008
(Continued)

OTHER PUBLICATIONS

English Translation of Search Report issued for CN application 201180028489.8 mailed on Aug. 29, 2014.
(Continued)

*Primary Examiner* — Alexander Gilman
(74) *Attorney, Agent, or Firm* — Pearl Cohen Zedek Latzer Baratz LLP

(57) ABSTRACT

Embodiments of the present invention are directed to a two-part cable connector. The connector includes two parts that when mate together the outer shape and dimensions of the connector are compatible to an outer shape and dimensions of a cable connector of a known standard. The first connector part terminated at an end of a communication cord and the second connector part detachably connected to the first connector to enable separation of said second part from said first part. The second connector part of the cable connector is insertable into a communication port and comprises an identification number to uniquely identify the communication port.

12 Claims, 4 Drawing Sheets

(51) Int. Cl.
*H04Q 1/02* (2006.01)
*H01R 13/506* (2006.01)
*H01R 13/627* (2006.01)
*H01R 13/717* (2006.01)
*H01R 24/64* (2011.01)

(52) U.S. Cl.
CPC .......... *H01R 13/506* (2013.01); *H01R 13/6272* (2013.01); *H01R 13/6275* (2013.01); *H01R 13/7175* (2013.01); *H01R 24/64* (2013.01)

(56) References Cited

U.S. PATENT DOCUMENTS

| | | | | |
|---|---|---|---|---|
| 7,229,309 | B2* | 6/2007 | Carroll et al. | 439/418 |
| 8,172,468 | B2* | 5/2012 | Jones et al. | 385/92 |
| 8,333,518 | B2* | 12/2012 | Jones et al. | 385/92 |
| 8,477,031 | B2* | 7/2013 | McNally et al. | 340/568.2 |
| 2003/0061393 | A1* | 3/2003 | Steegmans et al. | 709/250 |
| 2004/0219827 | A1* | 11/2004 | David et al. | 439/515 |
| 2006/0148279 | A1* | 7/2006 | German et al. | 439/49 |
| 2008/0100440 | A1* | 5/2008 | Downie et al. | 340/572.1 |
| 2010/0079248 | A1* | 4/2010 | Greveling | 340/10.1 |
| 2010/0267274 | A1* | 10/2010 | McNally et al. | 439/488 |
| 2011/0141943 | A1* | 6/2011 | Shifris et al. | 370/254 |

FOREIGN PATENT DOCUMENTS

| | | |
|---|---|---|
| CN | 101647293 | 2/2010 |
| DE | 10 2004 033940 | 2/2006 |
| GB | 2 375898 | 11/2002 |
| WO | WO 2010/001400 | 1/2010 |

OTHER PUBLICATIONS

International Search Report for International Application No. PCT/IL2011/000966 dated Apr. 18, 2012.

* cited by examiner

TWO-PART MODULAR CONNECTOR AND SMART MANAGED INTERCONNECT LINK USING THE TWO-PART MODULAR CONNECTOR

CROSS-REFERENCE TO RELATED APPLICATIONS

This application is a National Phase Application of PCT International Application No. PCT/IL2011/000966, International Filing Date Dec. 27, 2011, claiming priority of U.S. Patent Application No. 61/427,678, filed Dec. 28, 2010 which is hereby incorporated by reference.

BACKGROUND OF THE INVENTION

Cable connectors, such as jack connectors are well known in the data communication field. Connectors are widely used in communication networks which include a large number of patch panels, switches and end devices all dynamically connected by multiconductor cables, also known as patch cords or patch cables having connectors at their ends. Management of the connectivity of the physical layer of a communication layer includes monitoring and mapping of connection patterns between the end point devices and the network switch, which may require real-time identification (ID) of the communication switch ports to detect changes in the connections between end point devices and the switch.

Some existing solutions require installation of add-on hardware over front panels which may lead to cumbersome handling of the panels as the add-on device may cause mechanical interference while connecting and disconnecting patch cords. Other solutions may require modifications of the modular jack and the modular plug which is not desired.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
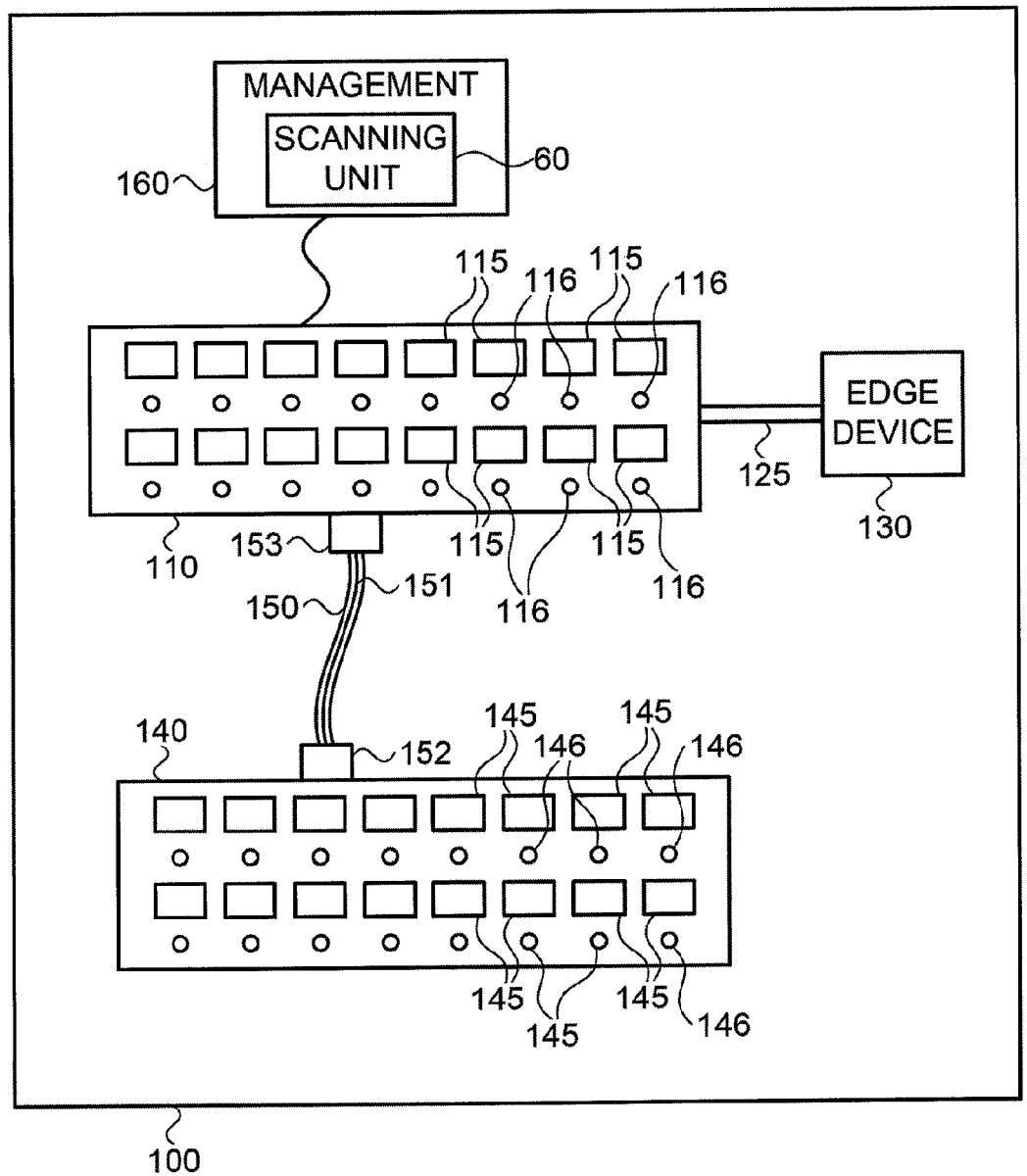
FIG. 1 is a high level illustration of a part of an exemplary communication cabling system in an interconnect network topology in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the embodiments of present invention may be practiced without these specific details. In other instances, well-known methods, procedures and components have not been described in detail so as not to obscure the present invention.

Embodiments of the present invention are directed to a two-part connector. The connector includes two parts or elements that when combined together may be used as a communication cable connector of a known standard, e.g., an RJ-45 plug. When the two mating parts are separated, one of the elements which includes an identification number, may remain located inside a communication port to uniquely identify the port while the other element may remain terminated at an end of a communication cord.

Reference is now made to FIG. 1, which is a high level illustration of a part of an exemplary communication cabling system in an interconnect network topology in accordance with embodiments of the present invention. Communication cabling systems may include patch panels which are used as elements connecting end users, for example, computers or telephones to network switches, such as an Ethernet switch. The connection may be performed by using communication cables such as patch cords which may include a two-part modular connector at least at one of their ends.

A two-part cable connector or plug according to embodiments of the invention, may include two mechanical parts or elements which may be separated or combined together. When combined together, the outer shape and dimensions of the connector are compatible to an outer shape and dimensions of a cable connector of a known standard. For example, the two-part plug may be compatible with an RJ-45 plug. When desired, the connector may be used as a two-part connector, where a first element terminated at an end of a communication cord and a second element, separable from the first element may fit and mounted into a standard female jack or a communication port while the first part is attached to and removed along with the communication cord. The element mounted into the port, e.g., switch port, may include a unique identification, e.g. an identification number, which may give the port its unique identification.

A communication cabling system 100 according to embodiments of the invention may provide real-time monitoring and control of end-to-end physical layer connectivity and further may guide a technician by selective activation of visual indicators to perform required changes in the connectivity pattern.

System 100 may include a smart patch panel 110 coupled to a connectivity management system 160, edge devices or end-point devices, such as an edge device 130, a network switch 140 and patch cables, such as patch cable 150. Network switch 140, such as, for example, an Ethernet switch may be dynamically coupled to patch panel 110 via patch cables having at least at one end a two-part connector, designed according to embodiments of the invention. The term "smart patch panel" as used herein refers to a patch panel capable of transmitting control signals via the communication ports without interfering data transfer. Data signals may be transmitted over the data wires of patch cable 150 according to any known standard, such as for example, TIA/EIA 568-C.2 or ISO/IEC 11801 second edition and control signals may be transmitted over additional dedicated control wires as detailed below.

Patch panel 110 may include a plurality of communication ports 115, also refer herein as patch panel ports and a plurality of visual status indicators 116, each associated with a respective port 115 and a scanning circuitry module (not shown) coupled to management system 160, to the communication ports 115 and to the status indicators 116. These status indicators may be visual status indicators, such as Light emitting diode (LED) and other indicators. In the exemplary illustration of FIG. 1, for simplicity, only sixteen (16) ports 115 are illustrated, however, it should be understood to a person skilled in the art that the number of communication port may be any suitable number of ports, for example, twenty four (24), thirty two (32) or forty eight (48) ports. Although embodiments of the present invention are not limited in this respect, patch panel 110 may provide the characteristics of a structured cabling system according to international standards, such as TIA/EIA-568-C and ISO/IEC 11801, and performance levels category 5E, 6, 6A and higher, defined in these standards.

Network switch 140 may include a plurality of communication ports 145, also refer herein as switch ports. In the exemplary illustration of FIG. 1, for simplicity, only sixteen (16) ports 145 are illustrated, however, it should be understood to a person skilled in the art that the number of communication port may be any suitable number of ports, for example, twenty four (24), thirty two (32) or forty eight (48) ports. According to some embodiments, network switch may further include a plurality of connectivity status indicators 146, each associated with a respective port 145. These status indicators may be visual status indicators, such as LED's embedded within a patch cable connector, as discussed in detail herein.

Management system 160 may continuously scans the connectivity configuration of all the patch cables to provide end-to-end physical layer connectivity control and real time monitoring. Further, system 160 may activate and control the operation of the visual indicators associated with the communication ports to guide a technician when performing Moves, Adds and Changes (MACs) operations. Management system 160 may include a scanning unit 60 coupled to the scanning module of patch panel 110 that may enable transmission and receipt of control signals over patch cords or other multiconductor cables connecting for example patch panel 110 and network switch 140. Scanning unit 60 may automatically and optionally continuously sense the connection arrangement of the patch cables. In an interconnect network topology, monitoring the connections between patch panel ports and switch ports provides the information regarding the connections between the switch and the end devices. An exemplary management system is sold under the trade name of PATCHVIEW by RiT Technologies Ltd., Tel Aviv, Israel, the assignee of this patent application.

Edge device 130 is connected to patch panel 110 via a communication cable 125, for example, a standard horizontal cable. Cable 125 may be terminated at a termination block on the rear side of patch panel 110 (not shown). The rear termination block is connected directly to one of a plurality of frontal communication ports 115 of patch panel 110.

Patch cable 150 may include a cord 151 with data signal wires (e.g. 8 wires) and control wires (e.g. 2 wires) and two connectors, each at one end of the cord. A first connector or plug 152 is for insertion into one of a plurality of switch ports 145 and a second connector or plug 153 is for insertion into one of the patch panel ports 115. Connector 152 and/or connector 153 may be a two-part connector described herein in embodiments of the invention.

According to embodiments of the invention, connector 152 may be a two-part modular plug compatible with any suitable standard. The two-part modular plug is designed with two separable or detachable parts, a first part having an identification number may be inserted into a communication port to remain constantly located within the switch port and a second part remains terminated at the cord. When the first part and the second part are attached, or fixed together they may have the exact shape and size of a standard plug. The two-part modular plug is further described herein with reference to FIG. 2A-2D. Connector 152 may be a smart connector embedding dedicated control circuitry and identification unit to provide a simple solution for transmission of switch port identification data. Cable connector 153 may be communication, plug according to any suitable standard. For example, connector 153 may be an RJ45 plug or a two-part modular plug compatible with an RJ45 plug.

Although embodiments of the invention are not limited in this respect, the two part connectors may be compatible with, for example, RJ45 connectors or compatible with RJ45 connectors, fiber optic plug, Multiple-Fibre Push-On/Pull-off (MPO/MTP) plug, or any other plug or connector. The insertion of first connector 152 (the switch connector) into one of switch ports 145 of network switch 140 and second connector 153 (the patch panel connector) into one of communication ports 115 of patch panel 110 creates a communication path for the transmission of data signals between network switch 140 and edge device 130. Switch connector 152 may include additional circuitry elements that enables transmission control signals directed to requests for a unique identification (ID) associated with the switch port on the control wires of cord 151.

Figure 2A:
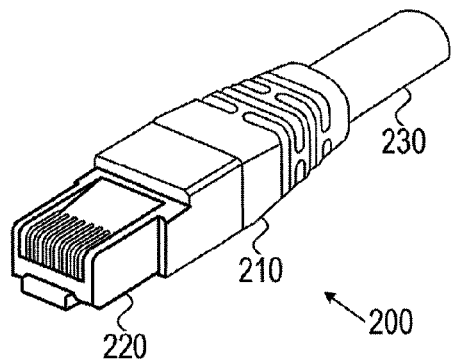
FIGS. 2A, 2B, 2C, and 2D are pictorial illustrations of an exemplary two-part modular connector according to embodiments of the present invention.
Figure 2B:
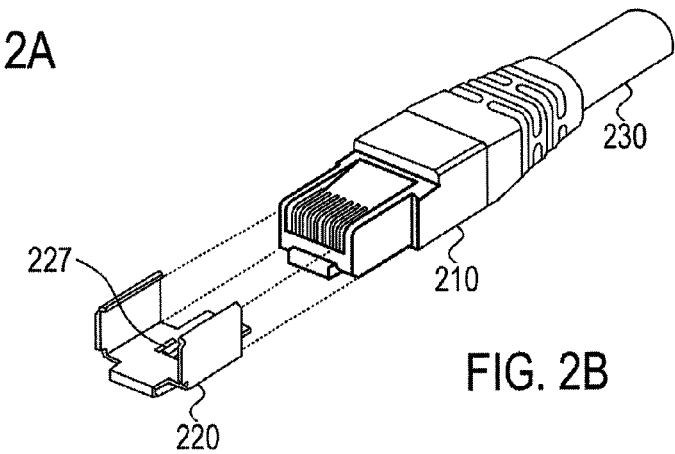
Figure 2C:
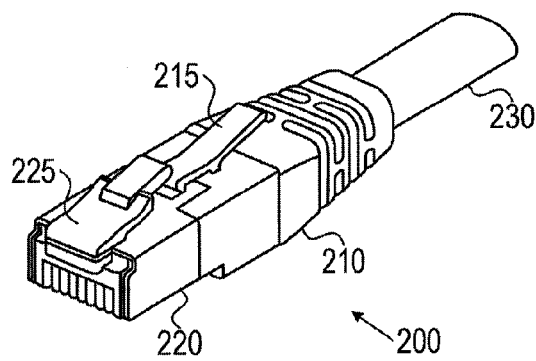
Figure 2D:
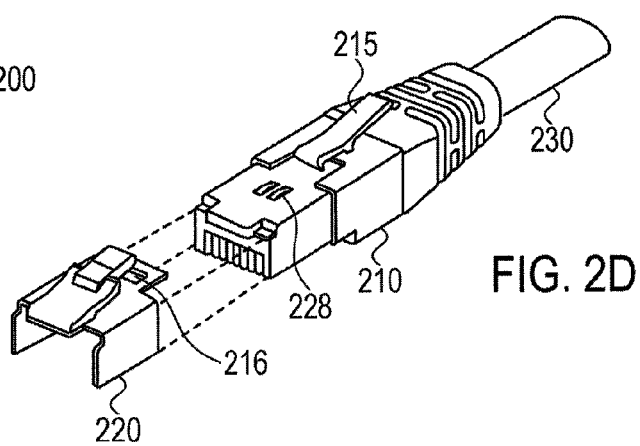

Reference is now made to FIGS. 2A-2D which are pictorial illustrations of an exemplary two-part connector according to embodiments of the present invention. FIG. 2A is a top view illustration of a two-part connector when the two parts are joined according to embodiments of the invention. FIG. 2B is a top view illustration of a two-part connector when the two parts are separated according to embodiments of the invention. FIG. 2C is a bottom view illustration of a two-part connector when the two parts are joined according to embodiments of the invention. FIG. 2D is a bottom view illustration of a two-part connector when the two parts are separated according to embodiments of the invention.

A two-part connector 200 is constructed of two parts, elements or components a first element 210 and a second element 220. When the two elements 210 and 220 are combined, joined, fixed or attached to each other as to create a complete connector 200 as shown in FIGS. 2A and 2C. Connector 200 may fit and may be inserted into any compatible female jack. It should be understood to a person skilled in the art that the two-part connector which is compatible with RJ-45 connector presented in the figures is merely a non-limiting example and embodiments of the invention are not limited in this respect. Accordingly, the two-part connector may be designed according to any other present or future standard in order to fit into any form factor female jack, such as, for example, RJ-45, LC, SC, GG45, Tera, ST, MPO, MPT.

FIGS. 2B and 2D illustrate connector 200 in a detached form, namely, when element 210 is separated from element 220. Element 210 is constantly connected to one end of a communication cable, while element 220 may be connected to element 210 or separated from element 210. Element 210 may include a locking element 215 (shown in FIGS. 2C and 2D) which may fit inside an opening 216 in element 220 such as to allow a connection or attachment of element 210 to element 220 as shown in FIG. 2C. Element 220 may include a lock lever 225 to enable locking of element 220 inside a modular jack of a communication port. A user may easily connect and disconnect between elements 210 and 220 by using element 215 as well as between connector 200 to the communication port by using element 225. Element 220 may include and an identification plate 227 containing a unique identification and a LED as shown by FIG. 3. The identification plate 227 may be implemented by an electrical element that may mechanically support and electrically connect electronic components such as for example, a printed circuit board (PCB). Plate 227 may include two identification contacts 226 (shown in FIG. 3) to transmit the unique identification via two contacts 228 located in element 210 to dedicated wires in communication cable 230.

Figure 3A:
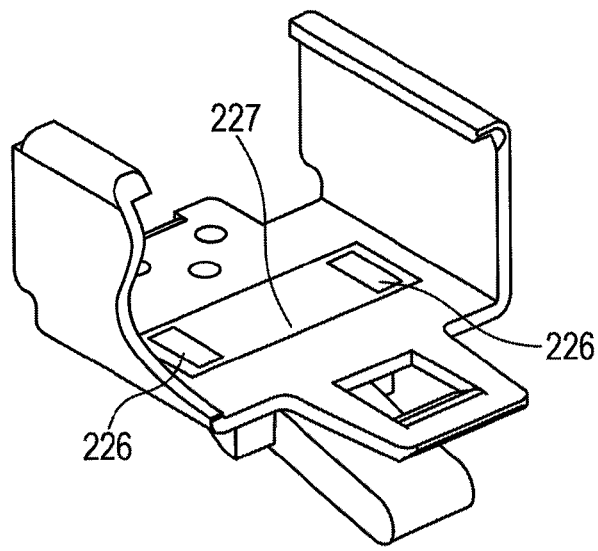
FIGS. 3A and 3B are pictorial illustrations of a top view and a bottom view of a first element of an exemplary two-part modular connector according to embodiments of the present invention.
Figure 3B:
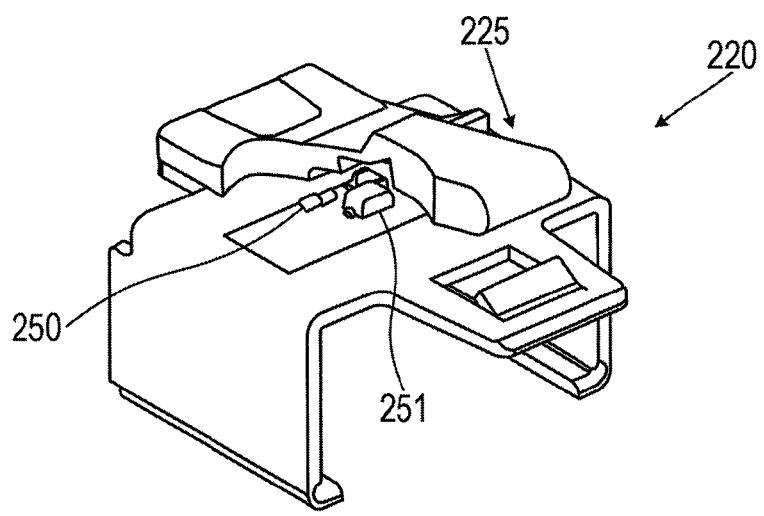

Reference is made to FIGS. 3A and 3B which are pictorial illustrations of a top view and a bottom view of a first element of an exemplary two-part modular connector according to embodiments of the present invention. FIG. 3A is a top view of element 220 which may carry, hold or include identification plate 227. Identification plate 227 may include two electrical contacts 226. When element 210 is connected to element 220 an electrical signal may be transferred between elements 210 and 220 by contacts 226. Identification plate 227 may further include an identification element 250 to hold or save unique identification. Element 250 may be any form of an electrical circuit such as an integrated circuit, chip, microchip, microprocessor and the like. Identification plate 227 may further include an indicator 251 such as a LED. Element 220 may be fixed or attached into a communication port by lock lever 225 shown in FIG. 3B.

Figure 4:
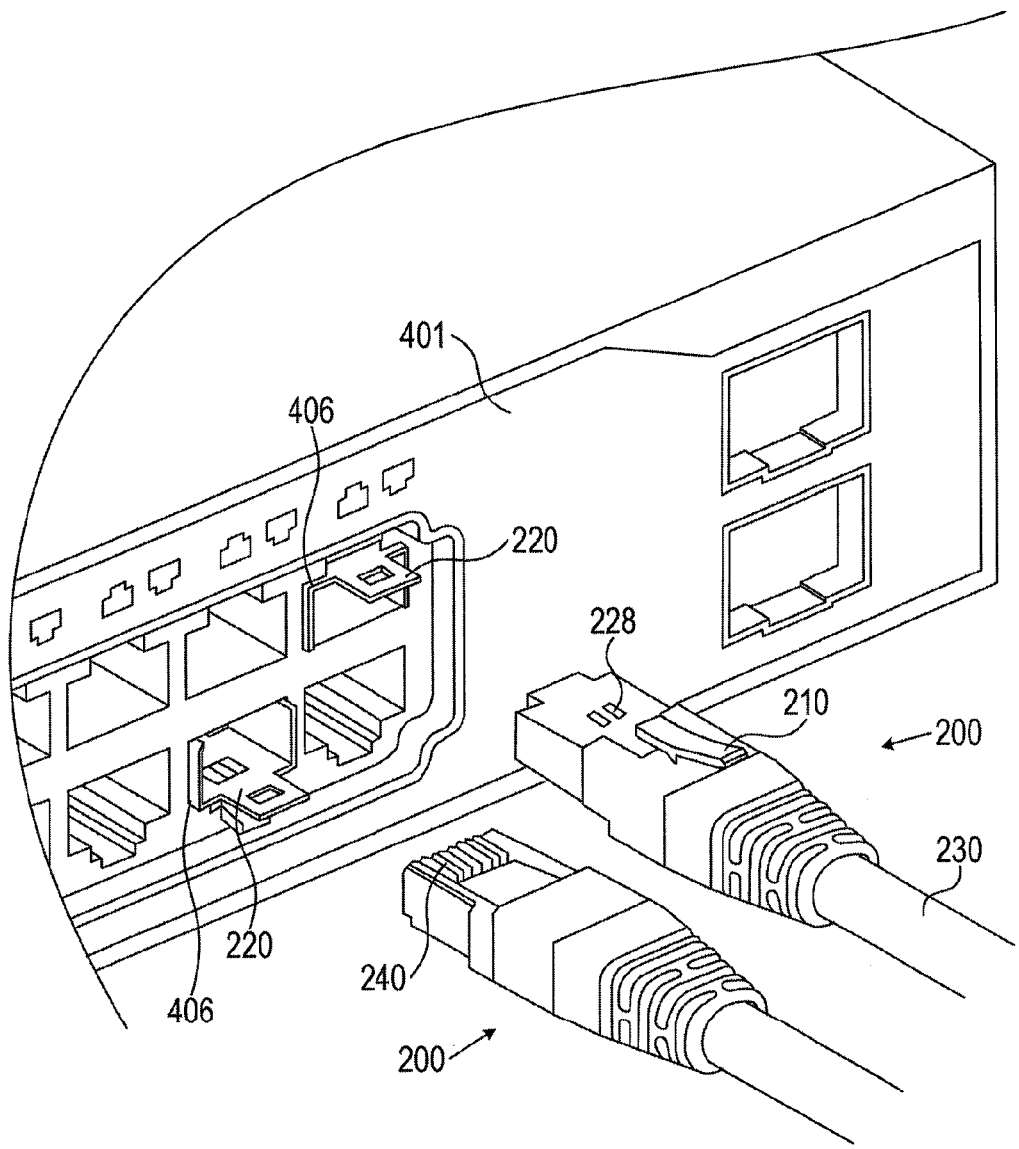
FIG. 4 is a pictorial illustration of an exemplary two-part modular connector being connected to a communication panel according to embodiments of the present invention.

Reference is made to FIG. 4 which is a pictorial illustration of an exemplary two-part modular connector being connected to a communication panel according to embodiments of the present invention. FIG. 4 illustrates a communication panel 401, e.g., a network switch panel and a two part connector 200 (shown in top view and bottom view). A panel 401 may include a plurality of communication sockets or ports 402. Each of the ports 402 is able to receive a two-part connector described in embodiments of the invention. Two-part connector 200 may include two parts or elements, a frontal element 220, inserted into communication port 406, and a rear element 210 terminated at cable cord 230. As illustrated by FIGS. 2A and 2B, elements 210 and 220 may be combined together to create a connector compatible to any desired connector, for example, RJ-45 connector. When elements 210 and 220 are attached, fixed or joint together, the outer shape and dimensions of the two-part connector may be compatible to an outer shape and dimensions of a standard connector. As illustrated by FIG. 4, frontal element 220 may be separated from rear element 210 and patch cord 230 and may stay inside any particular socket, for example, sockets 406. When rear element 210 which include an electrically conductive portion is inserted into socket 406 it is combined with the frontal element 220 by a lock lever element (element 215 shown in FIG. 2C). Element 210 may include electrical contacts 228 which may be in contact with identification contacts 226 located within the identification plate 227 of element 220 and may enable read of the unique identification of element 220.

Element 220 may extend from the opening of port 406 to allow an easy, simple and effortless connection and disconnection of element 210 to element 220 by a user at any desirable time. When combined with element 210 the conductive pins 240 of element 210 are connected directly with the conductive pins or contacts inside port 406 through which data may be transferred to cord 230. Accordingly, no modification in the geometry or functioning of the port is required.

According to embodiments of the invention, the unique identification of element 220 may be located in identification element 250 (shown in FIG. 3B) located within identification plate 227. The unique identification may be constantly mated with a certain switch port 406 while remain located inside port 406 and therefore may provide the switch port its unique identification. As the unique identification may be burned or saved in element 250 which is included in element 220, as long as element 220 is mounted into a switch port, the identification number uniquely represents that specific port even when element 210 together with cable cord 230 being removed from the switch port. Element 220 may be removed by a user from the switch port on any given time by unlocking, the locking element 225. Element 220 may extend from port 406 to allow its removal from the communication port by a user.

According to embodiments of the invention, identification plate 227 that includes a unique identification element 250, e.g., identification number, may be mounted on, fixed or attached to element 220. The insertion of element 220 into a particular socket, provides a unique identification number to the communication port associated with that socket. It should be understood that element 220 may remain located in the socket even when patch cord 230 along with element 210 are removed. Accordingly, the port of the respected socket may be provided with a single unique identification. Element 220 may extend from port 406 to allow removing from socket 406 at any time by a user. Patch cord 230 may include additional wires in order to allow transferring of identification signals. For example, patch cord 230 has 10 pins instead of 8 on the same form factor of RJ-45 connector. Wire 0 along with Wire 9 may be used for sending identification signals to enable smart cabling for interconnect. Both wires and pins are used to read the unique identification on part 220 of patch cord's RJ-45 connector.

In the exemplary illustration of FIGS. 2A-2D and 3, RJ45-compatible connectors are illustrated, however, it should be understood to a person skilled in the art that any desired form, shape or appearance of a connector may be applicable.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A two-part cable connector comprising:
   first and second connector parts separable from each other and when combined together having an outer shape and dimensions of an RJ-45 plug,
   the first connector part terminated at an end of a communication cord and is configured to be constantly connected to the communication cord; and
   the second connector part is insertable into an RJ-45 communication port, wherein the second connector part comprises an electrical element, the electrical element comprising an identification element to identify the communication port and a visual status indicator wherein both side surfaces of each the first connector part and the second connector part being aligned.

2. The cable connector of claim 1, wherein the second connector part comprises identification contacts connectable to corresponding contacts on the first connector part to transfer identification signals to the communication cord when the second connector part is connected to the first connector part.

3. The cable connector of claim 1, wherein the second connector part comprises a first lock lever to enable removal of the second connector part from the communication port.

4. The cable connector of claim 1, wherein the first connector part comprises a second lock lever to enable connection of the first and second connector parts.

5. The cable connector of claim 1, wherein the first connector part comprises a plurality of contacts pins.

6. The cable connector of claim 1, wherein the communication cord comprises dedicated communication wires to receive identification signals from the second connector part.

7. The cable connector of claim 1, wherein the visual status indicator is a light emitting diode.

8. The cable connector of claim 1, wherein the electrical element comprises an identification plate.

9. The cable connector of claim 8, wherein the identification plate comprises a light emitting diode.

10. The cable connector of claim 8, wherein the identification plate comprises identification contacts.

11. The cable connector of claim 8, wherein the identification plate is a printed circuit board.

12. The cable connector of claim 1, wherein when the first and second connector parts are combined together, the two-part cable connector is configured to be used compatibly to the RJ-45 plug.

* * * * *